(12) United States Patent
Lee et al.

(10) Patent No.: US 11,564,190 B2
(45) Date of Patent: *Jan. 24, 2023

(54) GATEWAY SIGNALING METHOD FOR FREQUENCY/TIMING OFFSET, AND DEVICE THEREFOR

(71) Applicant: ELECTRONICS AND TELECOMMUNICATIONS RESEARCH INSTITUTE, Daejeon (KR)

(72) Inventors: Jae-Young Lee, Daejeon (KR); Sung-Ik Park, Daejeon (KR); Sun-Hyoung Kwon, Daejeon (KR); Heung-Mook Kim, Daejeon (KR); Nam-Ho Hur, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,261

(22) Filed: May 3, 2022

(65) Prior Publication Data

US 2022/0264499 A1 Aug. 18, 2022

Related U.S. Application Data

(63) Continuation of application No. 17/374,388, filed on Jul. 13, 2021, which is a continuation of application
(Continued)

(30) Foreign Application Priority Data

Jun. 7, 2017 (KR) .................. 10-2017-0070852
Jun. 14, 2017 (KR) .................. 10-2017-0074788
(Continued)

(51) Int. Cl.
  *H04W 56/00* (2009.01)
  *H04L 5/00* (2006.01)
  *H04W 72/04* (2009.01)

(52) U.S. Cl.
  CPC ....... *H04W 56/0035* (2013.01); *H04L 5/0007* (2013.01); *H04W 56/005* (2013.01); *H04W 56/0045* (2013.01); *H04W 72/0446* (2013.01)

(58) Field of Classification Search
  CPC ....... H04B 1/0475; H04B 1/62; H04L 1/1678; H04L 5/0007; H04L 5/0053; H04L 12/18;
(Continued)

(56) References Cited

U.S. PATENT DOCUMENTS 7,206,364 B2 * 4/2007 Miller .................. H04L 1/0071
                                                        370/335
7,564,905 B2 * 7/2009 Park .................. H04N 21/2368
                                                        375/259
(Continued)

FOREIGN PATENT DOCUMENTS

KR    10-2009-0074136 A    7/2009
KR    10-2010-0110718 A    10/2010
(Continued)

OTHER PUBLICATIONS

Popescu, V et al., "Co-Channel and Adjacent Channel Interference and Protection Issues for DVB-T2 and IEEE 802.22 WRAN Operation", *IEEE Transactions on Broadcasting*, vol. 60, No. 4, Dec. 2014, pp. 693-700 (8 pages in English).
(Continued)

*Primary Examiner* — James M Perez
(74) *Attorney, Agent, or Firm* — NSIP Law

(57) ABSTRACT

Disclosed herein are a gateway-signaling method for frequency/timing offsets and an apparatus for the same. An apparatus for transmitting a broadcast signal according to an
(Continued)

embodiment of the present invention includes a frequency/timing decision unit for determining a center frequency to which a frequency offset is applied using a carrier offset, which is identified using a timing and a management packet transmitted through a Studio-to-Transmitter Link (STL); and an RF signal generation unit for generating an RF signal to be transmitted, which corresponds to the center frequency.

16 Claims, 7 Drawing Sheets

Related U.S. Application Data

No. 16/620,649, filed as application No. PCT/KR2018/006432 on Jun. 7, 2018, now Pat. No. 11,096,182.

(30) Foreign Application Priority Data

| Jun. 15, 2017 | (KR) | 10-2017-0075632 |
| Jun. 20, 2017 | (KR) | 10-2017-0078002 |
| Jun. 4, 2018 | (KR) | 10-2018-0064453 |

(58) Field of Classification Search
CPC ....... H04L 12/66; H04L 25/49; H04L 27/367; H04L 27/368; H04L 47/78; H04L 47/781; H04L 47/782; H04W 72/082; H04W 72/005; H04W 72/0446; H04W 56/0035; H04W 56/004; H04W 56/0045; H04W 56/005

See application file for complete search history.

(56) References Cited

U.S. PATENT DOCUMENTS

| 7,944,809 | B2* | 5/2011 | Kim | H04L 1/0009 370/208 |
| 7,944,993 | B2* | 5/2011 | Dankberg | H04L 5/0016 375/267 |
| 8,194,772 | B2* | 6/2012 | Choi | H04L 1/06 370/335 |
| 8,467,482 | B2* | 6/2013 | Park | H04H 40/18 375/150 |
| RE44,335 | E* | 7/2013 | Park | H04N 21/233 375/259 |
| 8,948,293 | B2* | 2/2015 | Onggosanusi | H04B 7/0452 375/284 |
| 9,083,408 | B2* | 7/2015 | Merlin | H04B 7/0617 |
| 9,154,352 | B2* | 10/2015 | Palanki | H04L 27/2601 |
| 9,713,019 | B2* | 7/2017 | Negus | H04W 24/02 |
| 9,991,972 | B1* | 6/2018 | Dogan | H04B 7/0617 |
| 10,187,126 | B2* | 1/2019 | Saha | H04B 7/024 |
| 10,225,040 | B2* | 3/2019 | Park | H04L 1/0071 |
| 10,454,536 | B2* | 10/2019 | Park | H04L 25/0204 |
| 10,505,593 | B2* | 12/2019 | Okuyama | H04L 5/0023 |
| 10,673,549 | B1* | 6/2020 | Smalley | H04W 4/02 |
| 10,873,343 | B2* | 12/2020 | Myung | H03M 13/1157 |
| 10,873,350 | B2* | 12/2020 | Oh | H04N 21/426 |
| 10,917,448 | B2* | 2/2021 | Lee | H04L 65/65 |
| 11,095,323 | B2* | 8/2021 | Lee | H04L 12/189 |
| 11,096,182 | B2* | 8/2021 | Lee | H04L 27/14 |
| 11,153,849 | B2* | 10/2021 | Lee | H04W 72/005 |
| 2002/0027957 | A1* | 3/2002 | Paulraj | H04B 7/0842 375/267 |
| 2004/0041948 | A1* | 3/2004 | Collins | H04N 5/46 348/E7.039 |
| 2004/0148642 | A1* | 7/2004 | Park | H04N 21/242 375/240 |
| 2006/0253890 | A9* | 11/2006 | Park | H04H 20/18 375/240 |
| 2006/0270341 | A1* | 11/2006 | Kim | H04W 88/085 455/16 |
| 2007/0047586 | A1* | 3/2007 | Tieman | H04L 65/612 370/486 |
| 2008/0080436 | A1* | 4/2008 | Sandhu | H04W 52/241 370/328 |
| 2008/0274692 | A1* | 11/2008 | Larsson | H04L 5/0057 455/24 |
| 2008/0304555 | A1* | 12/2008 | Larsson | H04L 27/2601 375/211 |
| 2009/0143008 | A1* | 6/2009 | Hottinen | H04B 7/0619 455/11.1 |
| 2010/0008287 | A1* | 1/2010 | Lin | H04W 4/12 370/315 |
| 2010/0061293 | A1* | 3/2010 | Schiff | H04B 7/18534 370/316 |
| 2010/0150013 | A1* | 6/2010 | Hara | H04B 17/12 370/252 |
| 2010/0272005 | A1* | 10/2010 | Larsson | H04B 7/15564 455/24 |
| 2010/0273439 | A1* | 10/2010 | Kawai | H04L 25/06 455/113 |
| 2010/0316110 | A1* | 12/2010 | Choi | H04L 1/0065 375/232 |
| 2011/0188521 | A1* | 8/2011 | Simon | H04L 1/0071 370/509 |
| 2011/0199919 | A1* | 8/2011 | Lin | H04B 17/327 370/252 |
| 2011/0249708 | A1* | 10/2011 | Maca | H04B 7/15564 375/213 |
| 2011/0267991 | A1* | 11/2011 | Damnjanovic | H04L 1/1607 370/279 |
| 2011/0268064 | A1* | 11/2011 | Chen | H04L 5/0094 370/329 |
| 2011/0274031 | A1* | 11/2011 | Gaal | H04L 5/0051 370/315 |
| 2012/0051287 | A1* | 3/2012 | Merlin | H04L 25/03343 370/328 |
| 2012/0063383 | A1* | 3/2012 | Barbieri | H04W 72/082 370/329 |
| 2012/0099660 | A1* | 4/2012 | Mun | H04L 1/0057 375/E7.2 |
| 2013/0077504 | A1* | 3/2013 | Parikh | H04H 60/11 455/39 |
| 2013/0128897 | A1* | 5/2013 | Tiernan | H04L 12/403 370/442 |
| 2013/0201912 | A1* | 8/2013 | Sheng | H04B 7/0663 370/328 |
| 2013/0291046 | A1* | 10/2013 | Ko | H04L 27/26136 725/116 |
| 2013/0308505 | A1* | 11/2013 | Hong | H04H 20/42 370/310 |
| 2014/0140319 | A1* | 5/2014 | Doetsch | H04L 25/0228 370/330 |
| 2014/0161443 | A1* | 6/2014 | Zhou | H04B 10/0775 398/83 |
| 2014/0177753 | A1* | 6/2014 | Wang | H04B 1/0475 375/296 |
| 2015/0103965 | A1* | 4/2015 | Chari | H04L 27/0014 375/371 |
| 2015/0215193 | A1* | 7/2015 | Kim | H04J 3/0682 370/312 |
| 2016/0182171 | A1* | 6/2016 | Milbar | H04H 20/06 375/259 |
| 2016/0182192 | A1* | 6/2016 | Milbar | H04H 20/72 714/748 |
| 2016/0286012 | A1* | 9/2016 | Yu | H04L 69/321 |
| 2016/0302093 | A1* | 10/2016 | Fuller | H04H 20/12 |
| 2017/0005761 | A1* | 1/2017 | Oh | H04L 5/0053 |
| 2017/0019207 | A1* | 1/2017 | Park | H04L 1/0071 |
| 2017/0023751 | A1 | 8/2017 | Teuscher | |
| 2017/0223653 | A1* | 8/2017 | Weitnauer | H04W 56/0045 |
| 2017/0237510 | A1* | 8/2017 | Teuscher | H04L 27/2646 375/259 |
| 2017/0290057 | A1* | 10/2017 | Fang | H04W 74/0816 |
| 2017/0331577 | A1* | 11/2017 | Parkvall | H04B 7/0848 |

(56) References Cited

U.S. PATENT DOCUMENTS

| | | | | |
|---|---|---|---|---|
| 2017/0346525 | A1* | 11/2017 | Stirling-Gallacher | ........................ H04L 5/1469 |
| 2018/0254855 | A1* | 9/2018 | Shin | .................... H04L 27/2627 |
| 2018/0262653 | A1* | 9/2018 | Stewart | .................... H04N 5/40 |
| 2018/0351609 | A1* | 12/2018 | Park | .................. H04L 25/03343 |
| 2019/0199460 | A1* | 6/2019 | Simon | .................... H04H 20/18 |
| 2019/0222375 | A1* | 7/2019 | Wu | ........................ H04L 5/0035 |
| 2019/0305886 | A1* | 10/2019 | Baek | .................... H04L 1/0059 |
| 2019/0313137 | A1* | 10/2019 | Bui Do | .................... H04L 65/1069 |
| 2019/0387035 | A1* | 12/2019 | Lee | ........................ H04L 65/65 |
| 2020/0000221 | A1 | 1/2020 | Liu et al. | |
| 2020/0002210 | A1* | 1/2020 | Liu | ........................ C04B 33/13 |
| 2020/0022100 | A1* | 1/2020 | Simon | .................... H04L 7/0037 |
| 2020/0128511 | A1* | 4/2020 | Lee | .................... H04L 12/4633 |
| 2020/0136877 | A1* | 4/2020 | Kim | .................... H04L 27/2675 |
| 2020/0146019 | A1* | 5/2020 | Lee | .................... H04L 5/0007 |
| 2020/0195285 | A1* | 6/2020 | Lee | ........................ H04L 12/66 |
| 2020/0305031 | A1* | 9/2020 | Lee | .................... H04W 36/0085 |
| 2021/0377318 | A1* | 12/2021 | Jung | .................... H04W 28/0819 |
| 2021/0409155 | A1* | 12/2021 | Lee | ........................ H04L 25/49 |
| 2022/0007334 | A1* | 1/2022 | Lee | .................... H04W 72/005 |
| 2022/0015054 | A1* | 1/2022 | Lee | .................... H04W 56/005 |
| 2022/0264499 | A1* | 8/2022 | Lee | ........................ H04L 27/26 |

FOREIGN PATENT DOCUMENTS

| | | |
|---|---|---|
| WO | WO 2008/069555 A1 | 6/2008 |
| WO | WO 2012/018781 A1 | 2/2012 |
| WO | WO 2016/020842 A1 | 2/2016 |

OTHER PUBLICATIONS

International Search Report dated Sep. 10, 2018 in Corresponding International Patent Application No. PCT/KR2018/006432, pp. 1-14 (5 pages in English, 9 pages in Korean).

* cited by examiner

GATEWAY SIGNALING METHOD FOR FREQUENCY/TIMING OFFSET, AND DEVICE THEREFOR

CROSS REFERENCE TO RELATED APPLICATIONS

This application is a Continuation Application of U.S. patent application Ser. No. 17/374,388, filed on Jul. 13, 2021, which is a Continuation Application of U.S. patent application Ser. No. 16/620,649, filed on Dec. 9, 2019, which is a U.S. National Stage Application of International Application No. PCT/KR2018/006432, filed on Jun. 7, 2018, which claims the benefit under 35 USC 119(a) and 365(b) of Korean Patent Application No. 10-2018-0064453, filed on Jun. 4, 2018, Korean Patent Application No. 10-2017-0078002, filed on Jun. 20, 2017, Korean Patent Application No. 10-2017-0075632, filed on Jun. 15, 2017, Korean Patent Application No. 10-2017-0074788, filed on Jun. 14, 2017, Korean Patent Application No. 10-2017-0070852, filed on Jun. 7, 2017 in the Korean Intellectual Property Office, the entire disclosures of which is incorporated herein by reference for all purposes.

TECHNICAL FIELD

The present invention relates generally to technology for transmitting broadcast signals, and more particularly to a broadcast signal transmission system for mitigating co-channel interference.

BACKGROUND ART

With the introduction of new broadcast communication standards such as ATSC 3.0, service for a very robust SNR environment (a low system SNR threshold value) for mobile or handheld devices is provided.

Broadcast signals for such a low SNR system may reach a distance much further than the coverage contour of a 15 dB SNR of ATSC 1.0. Accordingly, there may be a very large overlapping area between neighboring co-channel transmitters that transmit different broadcast signals, and receivers in the overlapping area may receive signals transmitted from multiple transmitters.

Depending on FFT sizes and pilot patterns selected by neighboring co-channel transmitters, pilot overlapping may occur. Here, pilot overlapping may result in channel estimation errors, which may prevent a receiver from correctly receiving broadcast signals.

Therefore, a new broadcast signal transmission method for mitigating co-channel interference in a digital broadcast transmission system is required.

DISCLOSURE

Technical Problem

An object of the present invention is to mitigate co-channel interference in a digital broadcast transmission system.

Another object of the present invention is to enable transmitters to efficiently perform operations for mitigating co-channel interference by signaling information, which is necessary for mitigating co-channel interference, using the optimum number of bits.

A further object of the present invention is to simultaneously set a frequency offset and a timing offset using a single signaling field, thereby preventing superposition of pilots in the frequency domain and overlapping of bootstrap transmission timing.

Technical Solution

In order to accomplish the above objects, an apparatus for transmitting a broadcast signal according to the present invention includes a frequency/timing decision unit for determining a center frequency to which a frequency offset is applied using a carrier offset, which is identified using a timing and management packet transmitted through a Studio-to-Transmitter Link (STL); and an RF signal generation unit for generating an RF signal to be transmitted, which corresponds to the center frequency.

Here, the frequency/timing decision unit may determine a timing offset to be applied to a bootstrap corresponding to the RF signal using the carrier offset.

Here, the apparatus may further include a structure data extractor for extracting structure data, which is transmitted from a broadcast gateway device and includes data fields for all of transmitters in a transmitter group for transmitting the same waveform.

Here, the structure data extractor may extract a carrier offset field, which represents the carrier offset, from among the data fields.

Here, the carrier offset field may be a two's complement signed integer binary number, and may be represented as a positive or negative integer corresponding to an OFDM carrier.

Here, the carrier offset may be equal to the product of the carrier offset field value and carrier frequency spacing.

Here, the carrier frequency spacing may be equal to a baseband sampling rate divided by a minimum FFT size.

Here, the timing offset may be set so as to correspond to a delay when the carrier offset field value is a positive value, but may be set so as to correspond to an advance when the carrier offset field value is a negative value.

Also, a broadcast gateway device according to an embodiment of the present invention includes a packet generation unit for generating a timing and management packet for signaling a carrier offset to transmitters in a transmitter group for transmitting the same waveform; and an STL transmission unit for transmitting the timing and management packet to the transmitters through a Studio-to-Transmitter Link (STL).

Here, the carrier offset may be indicated by a carrier offset field, which is a two's complement signed integer binary number, and the carrier offset field may be represented as a positive or negative integer corresponding to an OFDM carrier.

Here, the carrier offset may be equal to the product of the carrier offset field value and carrier frequency spacing.

Here, the carrier frequency spacing may be equal to a baseband sampling rate divided by a minimum FFT size.

Here, when the carrier offset field value is a positive value, the timing offset of a bootstrap may correspond to a delay, and when the carrier offset field value is a negative value, the timing offset of the bootstrap may correspond to an advance.

Here, the carrier frequency spacing may correspond to a 6 MHz channel bandwidth and a baseband sampling rate of 6.192 Mega-samples/second.

Here, the same carrier frequency spacing may be maintained even when different FFT sizes are used for multiple subframes.

Also, a gateway-signaling method according to an embodiment of the present invention includes generating structure data for signaling a carrier offset to transmitters in a transmitter group for transmitting the same waveform; generating a timing and management packet including the structure data; and transmitting the timing and management packet to the transmitters through a Studio-to-Transmitter Link (STL).

Here, the carrier offset may be indicated by a carrier offset field, which is a two's complement signed integer binary number, and the carrier offset field may be represented as a positive or negative integer corresponding to an OFDM carrier.

Here, the carrier offset may be equal to the product of the carrier offset field value and carrier frequency spacing.

Here, when the carrier offset field value is a positive value, the timing offset of a bootstrap may correspond to a delay, and when the carrier offset field value is a negative value, the timing offset of the bootstrap may correspond to an advance.

Here, the same carrier frequency spacing may be maintained even when different FFT sizes are used for multiple subframes.

Advantageous Effects

According to the present invention, channel estimation errors, which may arise from strong co-channel interference, may be prevented.

Also, according to the present invention, information that is necessary in order to mitigate co-channel interference is signaled using the optimum number of bits, whereby transmitters may efficiently perform operations for mitigating co-channel interference.

Also, according to the present invention, a frequency offset and a timing offset are simultaneously set through a single signaling field, whereby superposition of pilots in the frequency domain and overlapping of bootstrap transmission timing may be prevented.

BEST MODE

Figure 1:
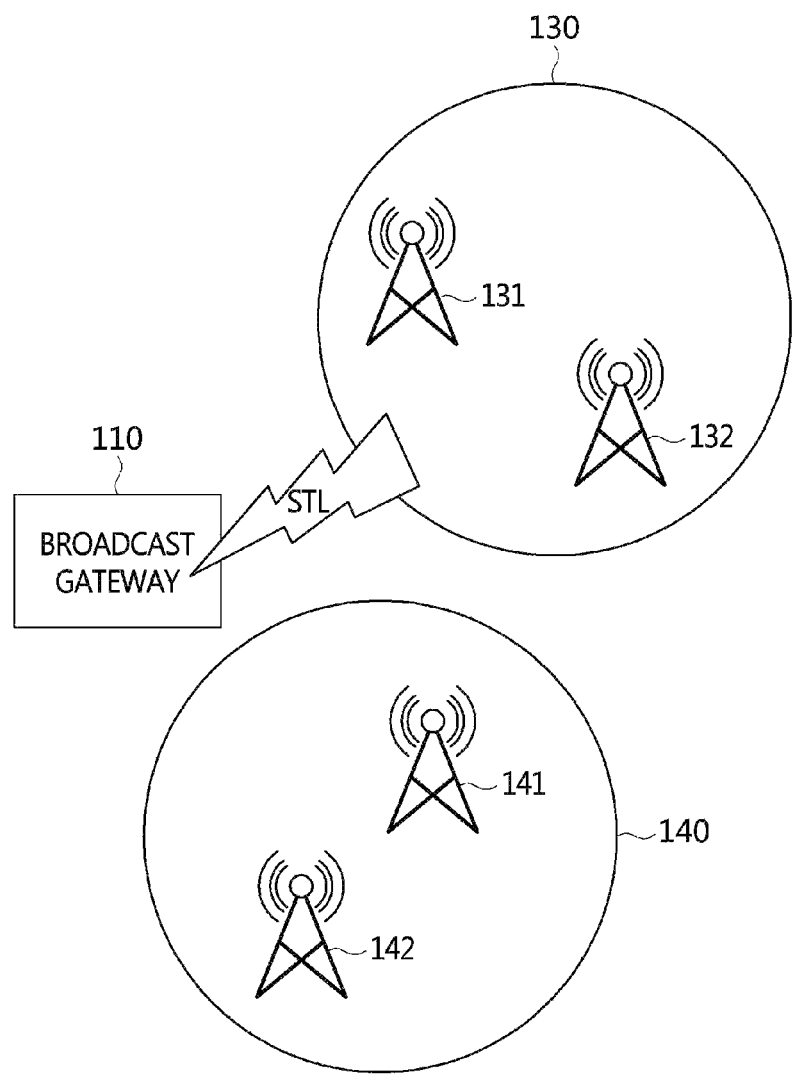
FIG. 1 is a view that shows a broadcast signal transmission system according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

When a plurality of geographically neighboring stations uses the same RF channel, interference occurs in the area in which signals transmitted therefrom overlap. Here, when the neighboring stations operate using identical or similar frame and waveform configurations, a problem in which channel estimation errors occur in receivers due to pilot overlap may be caused. This problem may arise when the pilot locations and characteristics in the multiple signals are sufficiently similar.

This problem may be severe when the various stations (transmitters) involved operate with highly robust emission characteristics having very low Signal-to-Noise Ratios (SNRs). The mechanism by which such interference is caused is the addition of pilot energy at each FFT carrier in a channel at which pilots are positioned. The addition of the pilot energy at each pilot frequency causes receivers to incorrectly estimate channels because channel estimation is not valid for any of the signals received in the area in which the signals of the transmitters overlap.

Next-generation broadcast communication system technologies, such as the ATSC 3.0 standard, support low-SNR operation for providing a much larger coverage contour than ATSC 1.0. When there are two or more neighboring stations that use the same RF channel while transmitting different content, reception failures may occur due to a channel estimation mismatch under strong co-channel interference.

In order to avoid pilot overlap, which may cause pilot-level addition, the carrier frequencies of neighboring transmitters (stations) may be offset by a small amount. Additionally, in order to prevent the recovery of bootstraps, which are transmitted from the neighboring stations, from failing in the area in which signals overlap, it is necessary to avoid overlapping of bootstrap emission timing.

Here, bootstrap emission timing may be the time at which the leading edge of the first symbol of a bootstrap is emitted from the antenna of a transmitter.

For example, it may be assumed that two neighboring co-channel transmitters A and B emit different programs. Here, the two transmitters may use the same Fast Fourier Transform (FFT), the same guard interval, and the same in-band pilot pattern. Here, all of the pilots from A and B may overlap (e.g., linear addition may be performed). Here, channel estimation by the receiver may correspond to a combined multipath profile A+B. This is mismatched with both the signal from A and the signal from B. Therefore, reception of the signals transmitted from the transmitters A and B may fail due to the channel estimation error.

In order to prevent pilot overlapping of co-channel broadcast signals while minimizing the change of broadcast signal receivers, the RF frequency of a transmitter may be offset by N times the OFDM subcarrier spacing (where N is an integer). Here, the OFDM subcarrier spacing is several hundred Hz, and thus does not cause a problem with the operation of existing transmitters.

When such an offset is applied, the receivers in the overlapping area may receive a signal transmitted from at least one transmitter.

FIG. 1 is a view that shows a broadcast signal transmission system according to an embodiment of the present invention.

Referring to FIG. 1, the broadcast signal transmission system according to an embodiment of the present invention includes a broadcast gateway device 110 and multiple transmitters 131 and 132.

Here, the transmitters 131 and 132 may be included in a group 130. Here, the transmitters 131 and 132 in the group 130 may emit the same waveform (that is, may correspond to a Single-Frequency Network (SFN)).

Here, there may be an additional group 140 of transmitters that emit a waveform that is different from the waveform emitted by the transmitters in the group 130. The transmitters 141 and 142 in the additional group 140 may emit the same waveform.

For example, the groups 130 and 140 may correspond to different broadcast service markets in the U.S.

Here, the transmitters 132 and 141 included in the different groups may transmit different programs. Here, co-channel interference may occur in an overlapping area in which the signals transmitted from the transmitters 132 and 141 overlap.

Here, co-channel interference may be mitigated when different frequency offsets are applied to the groups 130 and 140, respectively.

Here, the frequency offset may be set based on information signaled by the broadcast gateway device 110 corresponding to the group 130. That is, the broadcast gateway device 110 signals information that is necessary for setting a frequency offset to all of the transmitters included in the group 130, and all of the transmitters in the group 130 may set their frequency offsets based on the same information signaled from the broadcast gateway device 110. Accordingly, all of the transmitters in the group 130 may set the same frequency offset.

Here, all of the transmitters included in the additional group 140, which is adjacent to the group 130, may set their frequency offsets based on information signaled from another broadcast gateway device (not illustrated).

Accordingly, the groups 130 and 140 may set different frequency offsets.

The broadcast gateway device 110 transmits a carrier offset field for signaling a carrier offset to the transmitters 131 and 132, which are included in the transmitter group for transmitting the same waveform, through a Studio-to-Transmitter Link (STL).

That is, each of the transmitters 131 and 132 may be provided with the carrier offset field, which is necessary in order to set the frequency offset (carrier offset), from the broadcast gateway device 110 through the Studio-to-Transmitter Link (STL) and determine a center frequency to which the frequency offset is applied using the provided carrier offset field.

Here, the STL may be a data transmission/reception link between the broadcast gateway device 110 and the transmitters 131 and 132 in the broadcast transmission system, and may be a fiber, satellite, or microwave link. Here, the STL may be a wired or wireless link, and may be a link through which data is transmitted and received using a packet-based protocol, such as RTP, UDP, IP, or the like.

Figure 2:
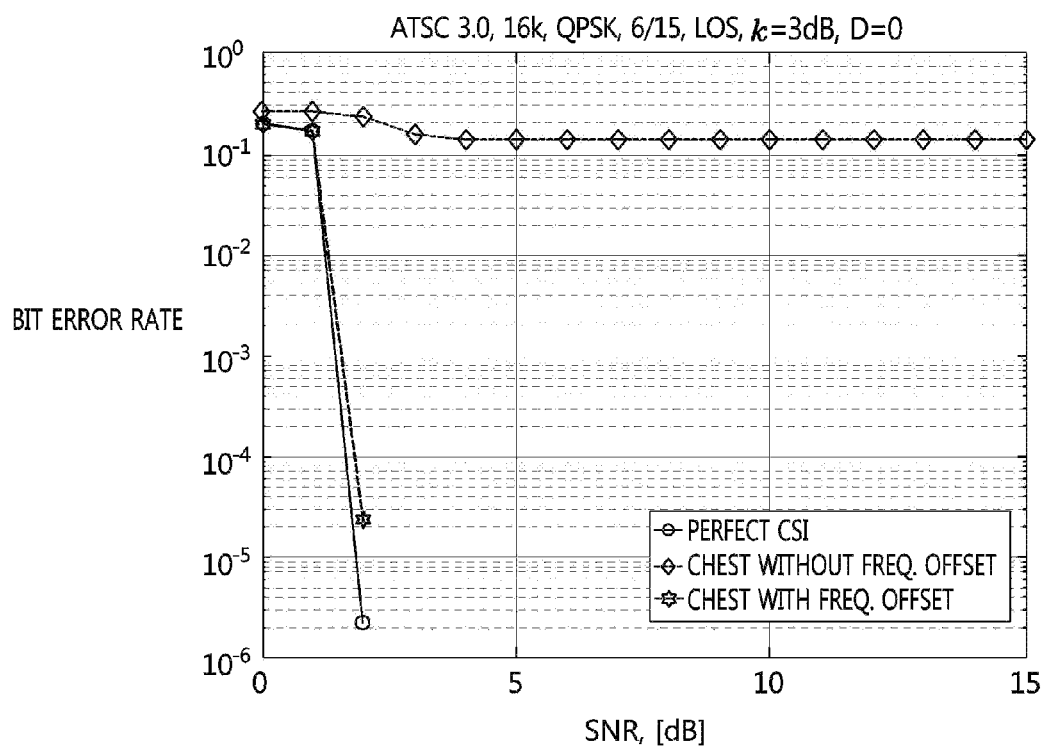
FIG. 2 is a view that shows the result of a simulation in which a frequency offset according to an embodiment of the present invention is applied.

FIG. 2 is a view that shows the result of a simulation in which a frequency offset according to an embodiment of the present invention is applied.

The simulation result in FIG. 2 shows the case in which 16K FFT (16384 FFT), QPSK, and LDPC R=6/15 are used and the Carrier-to-interference ratio (C/I) of two single-path channels is 3 dB.

Referring to FIG. 2, it is confirmed that reception failure occurs due to strong co-channel interference even though channel estimation is performed, but a signal may be successfully received when a frequency offset is used.

In FIG. 2, 'PERFECT CSI' shows the case in which the receiver knows the perfect channel response of each signal, 'CHEST WITHOUT FREQ.OFFSET' shows the case in which channel estimation is performed without application of a frequency offset, and 'CHEST WITH FREQ.OFFSET' shows the case in which a frequency offset is applied and channel estimation is performed.

When bootstrap signals from two neighboring co-channel stations overlap in the time domain, receivers do not know whether the overlap is caused due to multipath distortion from a single station or due to interference from the co-channel stations.

In order to enable the receivers to differentiate such interference signals while minimizing the change of the receivers, a frequency offset (carrier offset) and a timing offset may be used in transmitters. Here, when the frequency offset and the timing offset are used, receivers may successfully receive broadcast signals in an environment in which strong co-channel interference exists.

Here, a timing offset applied to co-channel transmitters may be useful to prevent bootstrap overlap. Here, the timing offset may correspond to the sum of a bootstrap and a guard interval. When a sufficient timing offset is applied, receivers may detect the presence of co-channel transmitters that emit different programs.

That is, neighboring co-channel transmitters may each use different bootstrap emission timing.

Here, all of the transmitters in a group for emitting the same waveform (e.g., SFN) may use the same bootstrap emission timing.

When multiple subframes for digital broadcast use different FFT sizes, a single carrier offset value corresponding to the smallest FFT size may be used.

Figure 3:
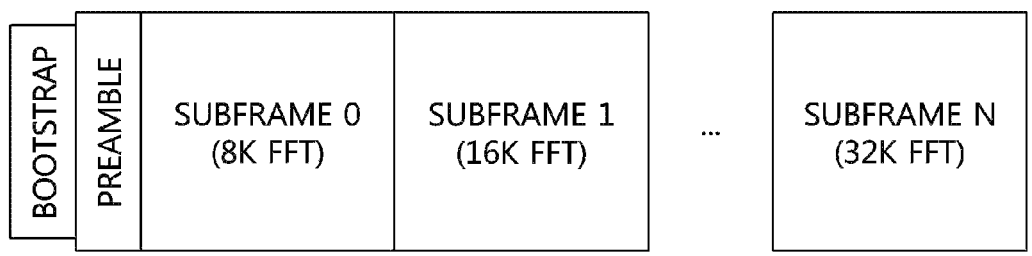
FIG. 3 is a view that shows the case in which subframes use different FFT sizes.

FIG. 3 is a view that shows the case in which subframes use different FFT sizes.

Referring to FIG. 3, SUBFRAME 0 uses 8K FFT, SUBFRAME 1 uses 16K FFT, and SUBFRAME N uses 32K FFT. Here, the FFT sizes of the 8K FFT, the 16K FFT, and the 32K FFT may be 8192, 16384, and 32768, respectively.

In the example shown in FIG. 3, the subframes use different FFT sizes, but the frequency offset applied to all of the subframes may correspond to the smallest FFT size. That is, rather than applying different frequency offsets to the subframes, the same frequency offset may be applied for the entire transmission signal.

Here, the frequency offset may be a multiple of the OFDM subcarrier spacing.

For example, if a baseband sampling rate (bsr) is 6.192 Mega-samples/second, the OFDM subcarrier spacing for 8K FFT is set to 6.912/8192=843.75 Hz, the OFDM subcarrier spacing for 16K FFT is set to 6.912/16384=421.874 Hz, and the OFDM subcarrier spacing for 32K FFT is set to 6.912/32768=210.9375 Hz.

That is, the OFDM subcarrier spacing for 16K FFT is twice the OFDM subcarrier spacing for 32K FFT, and the OFDM subcarrier spacing for 8K FFT is twice the OFDM subcarrier spacing for 16K FFT. Accordingly, when the frequency offset by the OFDM subcarrier spacing corresponding to the smallest FFT size is applied, the frequency offset is sufficient for all of the FFT sizes. Here, the FFT size may be indicated by the L1d_fft_size field or the L1B_first_sub_fft_size field of the preamble of a broadcast signal frame.

Here, in the example shown in FIG. 3, in which SUB-FRAME 0 uses 8K FFT, SUBFRAME 1 uses 16K FFT, and SUBFRAME N uses 32K FFT, the frequency offset by the OFDM subcarrier spacing corresponding to 8K FFT may be applied to all transmission signals.

Here, the baseband sampling rate may be determined to be 0.384 MHz×(16+bsr_coefficient). Here, bsr_coefficient may be a field signaled from the broadcast gateway device, or may be a binary value associated with a baseband sampling frequency. For example, the value of bsr_coefficient may be 2.

Here, 0.384 MHz may correspond to the condition of system_bandwidth=6 MHz, and system_bandwidth may be a value that represents the bandwidth of an RF transmission channel.

Figure 4:
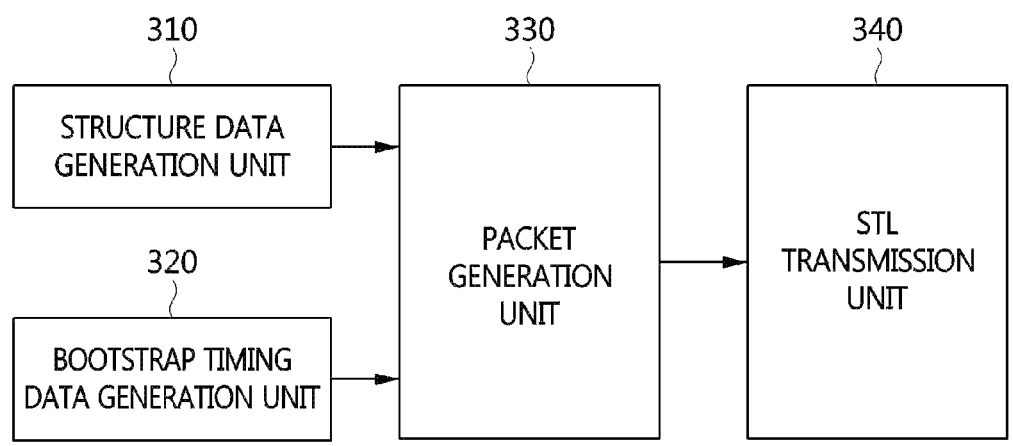
FIG. 4 is a block diagram that shows an example of the broadcast gateway device illustrated in FIG. 1.

FIG. 4 is a block diagram that shows an example of the broadcast gateway device illustrated in FIG. 1.

Referring to FIG. 4, the broadcast gateway device 110 shown in FIG. 1 includes a structure data generation unit 310, a bootstrap timing data generation unit 320, a packet generation unit 330, and an STL transmission unit 340.

The structure data generation unit 310 generates structure data, which includes data fields for all of the transmitters in a transmitter group for transmitting the same waveform. Here, the data fields may be used in common by all of the transmitters.

Here, the structure data generation unit 310 may generate a carrier offset field (tx_carrier_offset) for signaling the carrier offset as one of the data fields. That is, the data fields may include the carrier offset field.

Here, the carrier offset field may be a two's complement signed integer binary number, and may be represented as a positive or negative integer corresponding to an OFDM carrier.

Here, the carrier offset may be equal to the product of the carrier offset field value and the carrier frequency spacing.

Here, the carrier frequency spacing may be equal to the baseband sampling rate divided by the minimum FFT size. For example, because the FFT size may be any one of 8192 (8K), 16384 (16K), and 32768 (32K) in the ATSC 3.0 system, the minimum FFT size may be 8192.

Here, when the carrier offset field value is a positive value, this may indicate that the timing offset of a bootstrap corresponds to a delay, but when the carrier offset field value is a negative value, this may indicate that the timing offset of the bootstrap corresponds to an advance.

Here, the carrier offset spacing may correspond to 6 MHz channel bandwidth and a baseband sampling rate of 6.192 Mega-samples/second.

Here, the same carrier frequency spacing may be maintained even when different FFT sizes are used for multiple subframes.

The bootstrap timing data generation unit 320 generates bootstrap timing data, which includes fields (seconds and nanoseconds) for signaling the bootstrap emission timing of a bootstrap, which is included in a broadcast signal frame and transmitted by a broadcast signal transmitter. Here, the bootstrap timing data may include a list of pieces of bootstrap emission timing information of the subsequent frame(s).

The packet generation unit 330 generates a timing and management packet for signaling the carrier offset to transmitters in a transmitter group for transmitting the same waveform.

Here, the timing and management packet may include structure data and bootstrap timing data.

The STL transmission unit 340 transmits the timing and management packet to the transmitters through a Studio-to-Transmitter Link (STL).

The following Table 1 shows an example of the timing and management packet.

TABLE 1

| Syntax | No. of Bits | Format |
|---|---|---|
| Timing & Management_Packet (TMP) ( ) | | |
| { | | |
|   Structure_Data ( ) { | | |
|     length | 16 | uimsbf |
|     version_major | 4 | uimsbf |
|     version_minor | 4 | uimsbf |
|     maj_log_rep_cnt_pre | 4 | uimsbf |
|     maj_log_rep_cnt_tim | 4 | uimsbf |
|     bootstrap_major | 4 | uimsbf |
|     bootstrap_minor | 4 | uimsbf |
|     min_time_to_next | 5 | uimsbf |
|     system_bandwidth | 2 | uimsbf |
|     bsr_coefficient | 7 | uimsbf |
|     preamble_structure | 8 | uimsbf |
|     ea_wakeup | 2 | bslbf |
|     num_emission_tim | 6 | uimsbf |
|     num_xmtrs_in_group | 6 | uimsbf |
|     xmtr_group_num | 7 | uimsbf |
|     maj_log_override | 3 | bslbf |
|     num_miso_filt_codes | 2 | bslbf |
|     tx_carrier_offset | 2 | tcimsbf |
|     reserved | 6 | for (i = 0; i < 6; i++) '1' |
|   } | | |
|   Bootstrap_Timing_Data ( ) { | | |
|     for (i = 0; i <= num_emission_tim; i++) | | |
|     seconds | 32 | uimsbf |
|     nanoseconds | 32 | uimsbf |

TABLE 1-continued

| Syntax | No. of Bits | Format |
|---|---|---|
| } | | |
| } | | |
| Per_Transmitter_Data ( ) { | | |
|     for (i = 0; i < num_xmtrs_in_group; i++) | | |
| { | | |
|     xmtr_id | 13 | uimsbf |
|     tx_time_offset | 16 | tcimsbf |
|     txid_injection_lvl | 4 | uimsbf |
|     miso_filt_code_index | 2 | bslbf |
|     reserved | 29 | for (i = 0; i < 29; i++) '1' |
|     } | | |
| } | | |
| Error_Check_Data ( ) { | | |
|     reserved | 16 | |
|     crc16 | 16 | uimsbf |
|     } | | |
| } | | |

In Table 1, 'uimsbf' means unsigned integer, most significant bit first, 'bslbf' means bit stream, leftmost bit first, and 'tcimsbf' means two's complement integer, most significant bit first. In the example of Table 1, the timing and management packet may correspond to Timing & Management_Packet (TMP) ( ), the structure data may correspond to Structure_Data ( ), data for each transmitter may correspond to Per_Transmitter_Data ( ), and the bootstrap timing data may correspond to Bootstrap_Timing_Data ( ).

Here, the data fields, transmitted from the broadcast gateway device and to be applied for all of the transmitters in a transmitter group for transmitting the same waveform, may include length, version_major, version_minor, maj_log_rep_cnt_pre, maj_log_rep_cnt_tim, bootstrap_major, bootstrap_minor, min_time_to_next, system_bandwidth, bsr_coefficient, preamble_structure, ea_wakeup, num_emission_tim, num_xmtrs_in_group, xmtr_group_num, maj_log_override, num_miso_filt_codes, and tx_carrier_offset.

Here, the data fields for each of the transmitters may include xmtr_id, tx_time_offset, txid_injection_lvl and miso_filt_code_index.

Here, the carrier offset field may be tx_carrier_offset, the length of which is 2 bits.

Here, because tx_carrier_offset is defined in Structure_Data ( ) tx_carrier_offset may be applied in common to all of the transmitters that receive Timing & Management_Packet (TMP) ( ).

Here, tx_carrier_offset may indicate the carrier offset of the transmitter(s) in the frequency domain. Here, the carrier offset may be represented in units of a positive or negative integer number of carriers. Here, the carrier offset may be a two's complement signed integer binary number. Here, the two's complement signed integer binary number may include −1, 0 and 1. Here, −1 may represent a frequency offset corresponding to −1 OFDM carrier, 1 may represent a frequency offset corresponding to 1 OFDM carrier, and 0 may represent that a frequency offset is not applied.

Here, the value of the carrier offset may be a multiple of the frequency value, which represents the carrier frequency spacing, corresponding to 8K FFT (which is the minimum FFT size), in units of Hz. Here, the carrier frequency spacing may be 843.75 Hz. Here, the value of bsr_coefficient may be 2, and the value of system_bandwidth may be 6 MHz. Here, when the values of tx_carrier_offset are −1, 0 and 1, the values of the carrier offset corresponding thereto may be −843.75 Hz, 0 Hz, and 843.75 Hz, respectively. Here, the value of tx_carrier_offset may be −2, and the value of the carrier offset corresponding thereto may be −1687.5 Hz.

Here, the value of the carrier offset may be equal to the product of the value of tx_carrier_offset field and the carrier frequency spacing.

The tx_carrier_offset field may also be used to determine a timing offset, which is applied to bootstrap emission timing.

Here, the bootstrap emission timing may correspond to Bootstrap_Timing_Data Q. Here, Bootstrap_Timing_Data ( ) may include a seconds field having a length of 32 bits and a nanoseconds field having a length of 32 bits.

Here, Bootstrap_Timing_Data ( ) may include a list of pieces of bootstrap timing information of the subsequent frame(s).

Here, the seconds field may correspond to the 32 Least Significant Bits (LSBs) of the seconds portion of the International Atomic Time (TAI) value of the bootstrap emission timing, and the nanoseconds field may correspond to the nanoseconds portion thereof. Here, the value of the nanoseconds field may be represented as a 32-bit binary value that ranges from 0 to 999,999,999.

Figure 5:
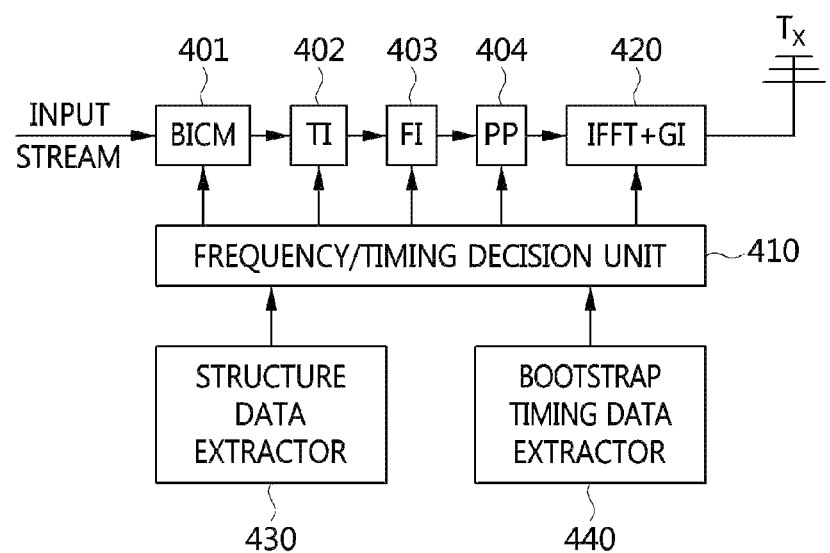
FIG. 5 is a block diagram that shows an example of the transmitter illustrated in FIG. 1.

FIG. 5 is a block diagram that shows an example of the transmitter illustrated in FIG. 1.

Referring to FIG. 5, the transmitter shown in FIG. 1 includes a BICM unit 401, a time interleaver 402, a frequency interleaver 403, a pilot pattern insertion unit 404, an RF signal generation unit 420, a frequency/timing decision unit 410, a structure data extractor 430, and a bootstrap timing data extractor 440.

The BICM unit 401, to which an input stream is input, performs channel coding, bit interleaving, and modulation.

The time interleaver 402 performs time interleaving for the input signal, and the frequency interleaver 403 performs frequency interleaving.

The pilot pattern insertion unit 404 inserts a pilot pattern in the frequency-interleaved signal.

The operations of the blocks, such as the BICM unit 401, the time interleaver 402, the frequency interleaver 403, and the pilot pattern insertion unit 404, are disclosed in detail in Korean Patent Application Publication No. 10-2017-0009737.

The frequency/timing decision unit 410 determines a center frequency to which a frequency offset is applied using a carrier offset, which is identified using a timing and management packet transmitted through a Studio-to-Transmitter Link (STL).

Here, the center frequency may be the center frequency of a band that is used to transmit broadcast signals. For example, if a fundamental center frequency is set to 10 GHz, the center frequency may be set to 10 GHz without change when a frequency (carrier) offset of 0 is applied, the center frequency may be set to 10 GHz+843.75 Hz when a frequency (carrier) offset of 843.75 Hz is applied, or the center frequency may be set to 10 GHz−843.75 Hz when a frequency (carrier) offset of −843.75 Hz is applied.

Here, when signals are received from two or more neighboring co-channel stations, different carrier offset values may be assigned to the respective co-channel stations.

Here, the frequency/timing decision unit 410 may determine the timing offset to be applied to the bootstrap of the RF signal using the carrier offset.

When neighboring co-channel stations use the same frame size or a multiple of a certain frame size, an overlap of bootstrap signals may occur. In order to avoid such a time-domain overlap of bootstraps, the transmitters may apply a timing offset thereto.

Here, the timing offset may be set so as to correspond to a delay when the carrier offset field value is a positive value, but may be set so as to correspond to an advance when the carrier offset field value is a negative value.

For example, if the fundamental timing is A, the bootstrap emission timing may be set to A+2 ms when a timing offset corresponding to a delay of 2 ms is applied, the bootstrap emission timing is set to A when a timing offset corresponding to 0 is applied, or the bootstrap emission timing may be set to A−2 ms when a timing offset corresponding to an advance of 2 ms is applied.

When signals from two or more neighboring co-channel stations are received in the same place, different timing offsets may be applied to the respective co-channel stations. For a group of transmitters for emitting the same waveform, the same timing offset may be applied thereto.

The RF signal generation unit 420 generates an RF transmission signal corresponding to the center frequency.

The RF signal generation unit 420 may be a block that includes an IFFT block, a PAPR block, a GI INSERTION block, and a BOOTSTRAP block.

The structure data extractor 430 extracts structure data, which is transmitted from the broadcast gateway device and includes data fields for all of the transmitters in a transmitter group for transmitting the same waveform.

Here, the structure data extractor 430 may extract a carrier offset field, which represents a carrier offset, from among the data fields.

Here, the carrier offset field is a two's complement signed integer binary number, and may be represented as a positive or negative integer corresponding to the OFDM carrier.

Here, the carrier offset may be equal to the product of the carrier offset field value and the carrier frequency spacing.

Here, the carrier frequency spacing may be equal to a baseband sampling rate divided by the minimum FFT size.

The bootstrap timing data extractor 440 extracts bootstrap timing data, which includes fields (seconds and nanoseconds) for signaling bootstrap emission timing.

Figure 6:
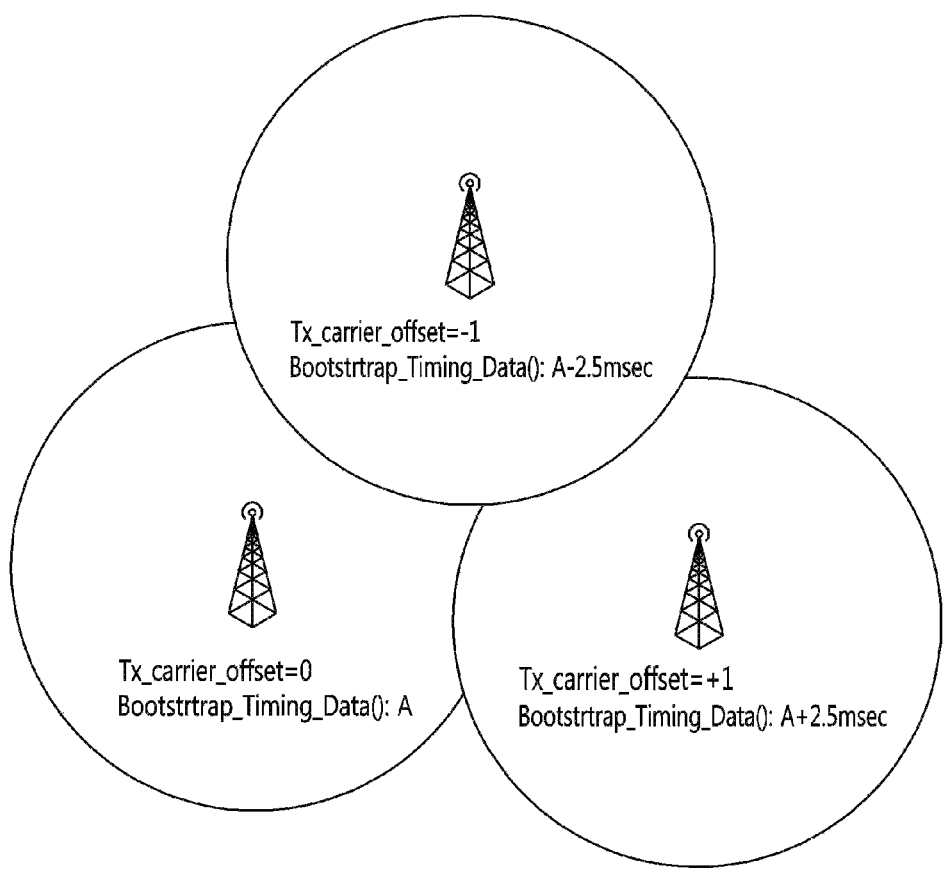
FIG. 6 is a view that shows neighboring co-channel stations to which frequency and timing offsets according to an embodiment of the present invention are applied.

FIG. 6 is a view that shows neighboring co-channel stations to which frequency and timing offsets according to an embodiment of the present invention are applied.

Referring to FIG. 6, tx_carrier_offset is set to −1, 0 and 1 for three stations, respectively, whereby different frequency offsets and different timing offsets are applied thereto.

When different frequency offsets and different timing offsets are applied, reception performance degradation attributable to pilot overlap may be prevented.

As in the example shown in FIG. 6, the bootstrap timing data may be set so as to correspond to different timing offsets.

Figure 7:
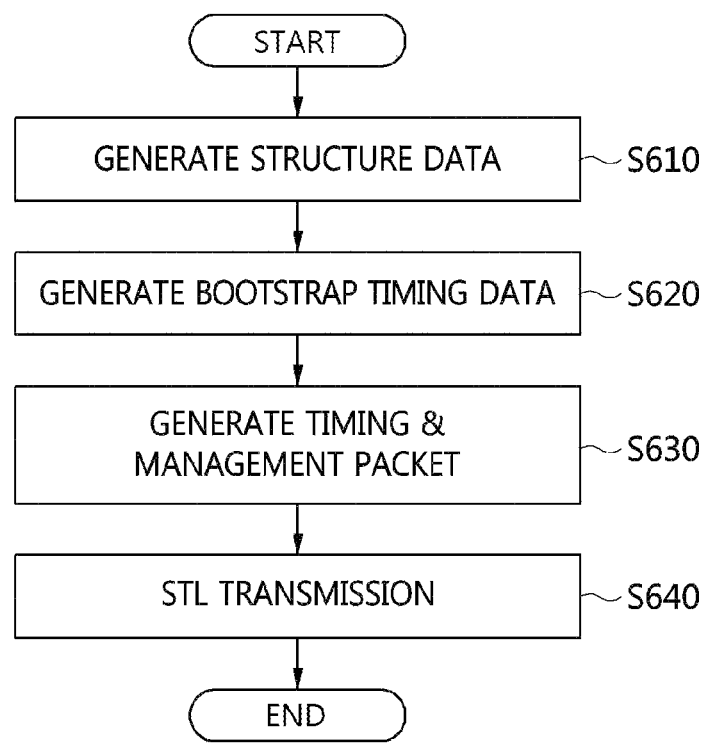
FIG. 7 is a flowchart that shows a gateway-signaling method according to an embodiment of the present invention.

FIG. 7 is a flowchart that shows a gateway-signaling method according to an embodiment of the present invention.

Referring to FIG. 7, in the gateway-signaling method according to an embodiment of the present invention, structure data for signaling a carrier offset to transmitters in a transmitter group for transmitting the same waveform is generated at step S610.

Here, the carrier offset is indicated by a carrier offset field, which is a two's complement signed integer binary number, and the carrier offset field may be represented as a positive or negative integer corresponding to an OFDM carrier.

Here, the carrier offset may be equal to the product of the carrier offset field value and carrier frequency spacing.

Here, when the carrier offset field value is a positive value, this may indicate that the timing offset of a bootstrap corresponds to a delay, and when the carrier offset field value is a negative value, this may indicate that the timing offset of the bootstrap corresponds to an advance.

Here, the same carrier frequency spacing may be maintained even when different FFT sizes are used for multiple subframes.

Also, in the gateway-signaling method according to an embodiment of the present invention, bootstrap timing data, including fields (seconds and nanoseconds) for signaling bootstrap emission timing, is generated at step S620.

Also, in the gateway-signaling method according to an embodiment of the present invention, a timing and management packet, including the structure data, is generated at step S630.

Also, in the gateway-signaling method according to an embodiment of the present invention, the timing and management packet is transmitted to the transmitters through a Studio-to-Transmitter Link (STL) at step S640.

Figure 8:
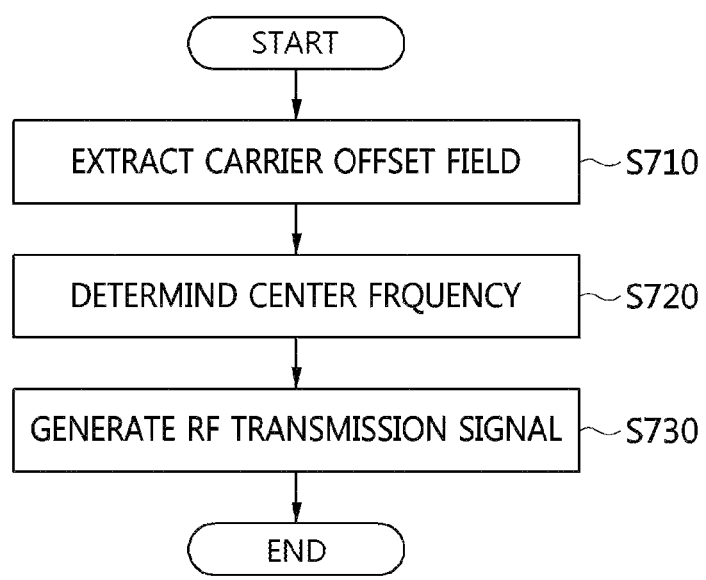
FIG. 8 is a flowchart that shows a method for transmitting a broadcast signal according to an embodiment of the present invention.

FIG. 8 is a flowchart that shows a method for transmitting a broadcast signal according to an embodiment of the present invention.

Referring to FIG. 8, in the method for transmitting a broadcast signal according to an embodiment of the present invention, structure data, which is transmitted from a broadcast gateway device and includes data fields for all of transmitters included in a transmitter group for transmitting the same waveform, is extracted at step S710.

Here, the structure data may be included in a timing and management packet, which is transmitted from the broadcast gateway device to the transmitters through a Studio-to-Transmitter Link (STL).

Here, the data fields may include a carrier offset field, which represents a carrier offset.

Here, the carrier offset field is a two's complement signed integer binary number, and may be represented as a positive or negative integer corresponding to an OFDM carrier.

Here, the carrier offset may be equal to the product of the carrier offset field value and carrier frequency spacing.

Here, the carrier frequency spacing may be equal to a baseband sampling rate divided by the minimum FFT size.

Also, in the method for transmitting a broadcast signal according to an embodiment of the present invention, a center frequency to which the frequency offset is applied is determined at step S720 using the carrier offset, which is identified using the carrier offset field included in the structure data.

Here, at step S720, a timing offset to be applied to the bootstrap of the RF signal may also be determined using the carrier offset when the center frequency is determined.

Here, the timing offset may be set so as to correspond to a delay when the carrier offset field value is a positive value, but may be set so as to correspond to an advance when the carrier offset field value is a negative value.

Also, in the method for transmitting a broadcast signal according to an embodiment of the present invention, an RF transmission signal corresponding to the center frequency is generated at step S730.

As described above, the gateway-signaling method and apparatus according to the present invention are not limitedly applied to the configurations and operations of the above-described embodiments, but all or some of the embodiments may be selectively combined and configured, so that the embodiments may be modified in various ways.

The invention claimed is:

1. An apparatus for transmitting an RF broadcast signal, comprising:
    a frequency/timing decision unit for determining a center frequency to which a frequency offset is applied using a carrier offset, the carrier offset identified by a carrier offset field of a received timing and management packet that was transmitted through a Studio-to-Transmitter Link (STL); and
    an RF signal generation unit for generating the RF broadcast signal to be transmitted, which corresponds to the center frequency,
    wherein the carrier offset field is a two's complement signed integer binary number.

2. The apparatus of claim 1, wherein the carrier offset field is represented as a positive or negative integer corresponding to an OFDM carrier.

3. The apparatus of claim 2, wherein the carrier offset is equal to a product of a carrier offset field value and carrier frequency spacing.

4. The apparatus of claim 3, wherein the carrier frequency spacing is equal to a baseband sampling rate divided by a minimum FFT size.

5. A broadcast gateway device, comprising:
    a packet generation unit for generating a timing and management packet for signaling a carrier offset to transmitters in a transmitter group for transmitting a same waveform; and
    an STL transmission unit for transmitting the timing and management packet to the transmitters through a Studio-to-Transmitter Link (STL),
    wherein the carrier offset corresponds to a carrier offset field, which is a two's complement signed integer binary number.

6. The broadcast gateway device of claim 5, wherein the carrier offset field is represented as a positive or negative integer corresponding to an OFDM carrier.

7. The broadcast gateway device of claim 6, wherein the carrier offset is equal to a product of a carrier offset field value and carrier frequency spacing.

8. The broadcast gateway device of claim 7, wherein the carrier frequency spacing is equal to a baseband sampling rate divided by a minimum FFT size.

9. The broadcast gateway device of claim 8, wherein:
    when the carrier offset field value is a positive value, a timing offset of a bootstrap corresponds to a delay, and
    when the carrier offset field value is a negative value, the timing offset of the bootstrap corresponds to an advance.

10. The broadcast gateway device of claim 9, wherein the carrier frequency spacing corresponds to a 6 MHz channel bandwidth and a baseband sampling rate of 6.192 Megasamples/second.

11. The broadcast gateway device of claim 10, wherein the same carrier frequency spacing is maintained even when different FFT sizes are used for multiple subframes.

12. A broadcast gateway signaling method, comprising:
    generating structure data for signaling a carrier offset to transmitters in a transmitter group for transmitting a same waveform;
    generating a timing and management packet including the structure data; and
    transmitting the timing and management packet to the transmitters through a Studio-to-Transmitter Link (STL),
    wherein the carrier offset corresponds to a carrier offset field, which is a two's complement signed integer binary number.

13. The broadcast gateway signaling method of claim 12, wherein the carrier offset field is represented as a positive or negative integer corresponding to an OFDM carrier.

14. The broadcast gateway signaling method of claim 13, wherein the carrier offset is equal to a product of a carrier offset field value and carrier frequency spacing.

15. The broadcast gateway signaling method of claim 14, wherein:
    when the carrier offset field value is a positive value, a timing offset of a bootstrap corresponds to a delay, and
    when the carrier offset field value is a negative value, the timing offset of the bootstrap corresponds to an advance.

16. The broadcast gateway signaling method of claim 15, wherein the same carrier frequency spacing is maintained even when different FFT sizes are used for multiple subframes.

* * * * *